United States Patent [19]

Lang et al.

[11] Patent Number: 5,071,354

[45] Date of Patent: Dec. 10, 1991

[54] ARTIFICIAL DENTURE-SKULL FOR DENTAL PURPOSES

[75] Inventors: Hans-Walter Lang, Leutkirch; Alfred Straka, Isny, both of Fed. Rep. of Germany

[73] Assignee: Kaltenbach & Voigt GmbH & Co., Biberach an der Riss, Fed. Rep. of Germany

[21] Appl. No.: 611,446

[22] Filed: Nov. 13, 1990

Related U.S. Application Data

[63] Continuation of Ser. No. 339,995, Apr. 18, 1989, abandoned.

[30] Foreign Application Priority Data

May 10, 1988 [DE] Fed. Rep. of Germany ....... 3816010

[51] Int. Cl.$^5$ ............................................. G09B 9/00
[52] U.S. Cl. ..................................... 434/263; 433/58; 434/264
[58] Field of Search ................. 434/263, 264; 433/57, 433/58, 59, 54, 55, 56, 187, 188, 67

[56] References Cited

U.S. PATENT DOCUMENTS

| | | | |
|---|---|---|---|
| 2,103,058 | 12/1937 | Burtenshaw . | |
| 2,549,339 | 4/1951 | Shore | 433/67 X |
| 2,670,538 | 3/1954 | Thompson | 433/58 X |
| 3,123,914 | 3/1964 | De Pietro | 433/60 |
| 3,387,369 | 6/1968 | Swanson | 433/58 |
| 3,510,947 | 5/1970 | Tuccillo et al. | 433/60 |
| 3,931,679 | 1/1976 | Carter . | |
| 3,965,576 | 6/1976 | Eveland | 433/56 |
| 4,034,475 | 7/1977 | Lee | 433/57 X |
| 4,163,319 | 8/1979 | Ouaknine | 433/60 |
| 4,601,664 | 7/1985 | Bertino, III et al. . | |

FOREIGN PATENT DOCUMENTS

2590475 5/1987 France ................... 433/60

OTHER PUBLICATIONS

"Frasaco", issued by Franz Sachs & Co. GmbH, Feb. 1986.

*Primary Examiner*—Richard J. Apley
*Assistant Examiner*—Rachel M. Healey
*Attorney, Agent, or Firm*—Scully, Scott, Murphy & Presser

[57] ABSTRACT

An artificial denture-skull for dental teaching and practice purposes, consisting of a model of an upper jaw equipped with teeth and which is arranged on an upper support plate, and a model of a lower jaw equipped with teeth which is arranged on a lower support plate, and wherein both support plates on the inner surfaces facing the dentures for the mounting of the jaw models incorporate an O-ring seating arrangement for the jaw models, against which there can be clamped the jaw models through the application of their base surface with the interposition of a clamping device extending through the support plates and which can be manipulated from the outside. For the most possibly exact simulation of the human head, the denture-skull can be also connected with a cerebral cavity-defining skull portion, as well as with a pocket-shaped covering which includes a mouth opening for the formation of a complete phantom head.

1 Claim, 2 Drawing Sheets

ARTIFICIAL DENTURE-SKULL FOR DENTAL PURPOSES

This application is a continuation, application Ser. No. 339,995, filed on Apr. 18, 1989.

BACKGROUND OF THE INVENTION

1. Field of the Invention

The present invention relates to an artificial denture-skull for dental teaching and practice purposes, consisting of a model of an upper jaw equipped with teeth and which is arranged on an upper support plate, and a model of a lower jaw equipped with teeth which is arranged on a lower support plate, and wherein both support plates on the inner surfaces facing the dentures for the mounting of the jaw models incorporate an O-ring seating arrangement for the jaw models, against which there can be clamped the jaw models through the application of their base surface with the interposition of a clamping device extending through the support plates and which can be manipulated from the outside. For the most possibly exact simulation of the human head, the denture-skull can be also connected with a cerebral cavity-defining skull portion, as well as with a pocket-shaped covering which includes a mouth opening for the formation of a complete phantom head.

2. Discussion of the Prior Art

A denture skull of this type has been known from the disclosure in the brochure "Frasaco" issued by Franz Sachs & Co. GmbH Kunststoffverarbeitung, pages 17 through 19. In this known denture-skull, the O-ring seating arrangement is presently constituted of a single O-ring which extends closely along the circumference of the clamping surface. Especially with regard to jaw models having relatively small model base surfaces, it is possible that no uniform contact is provided against the O-ring seating arrangement which is formed by the single O-ring, and consequently this results in a spanning of the jaw model which can bring along a deformation of the jaw model.

SUMMARY OF THE INVENTION

The invention as set forth in more extensive detail hereinbelow, has as its object to provide an artificial denture-skull of the above-mentioned type, wherein, in every instance, during the clamping or tightening of the jaw model, there is afforded a uniform contacting of the base surface of the jaw model against the O-ring seating arrangement.

The advantages which are attained through the invention can be essentially ascertained, as a result of the special arrangement of three O-rings, there is assured in every instance; in essence, also for jaw models with a smaller base surface, that the jaw model will cover all three O-rings with its base surface, in view of which there is achieved a uniform contacting of the base surface of the model with the O-ring seating arrangement.

BRIEF DESCRIPTION OF THE DRAWINGS

Advantageous modifications and further features of the invention can now be readily ascertained from the following detailed description of an exemplary embodiment, taken in conjunction with the accompanying drawings; in which.

DETAILED DESCRIPTION OF THE PREFERRED EMBODIMENTS

Figure 1:
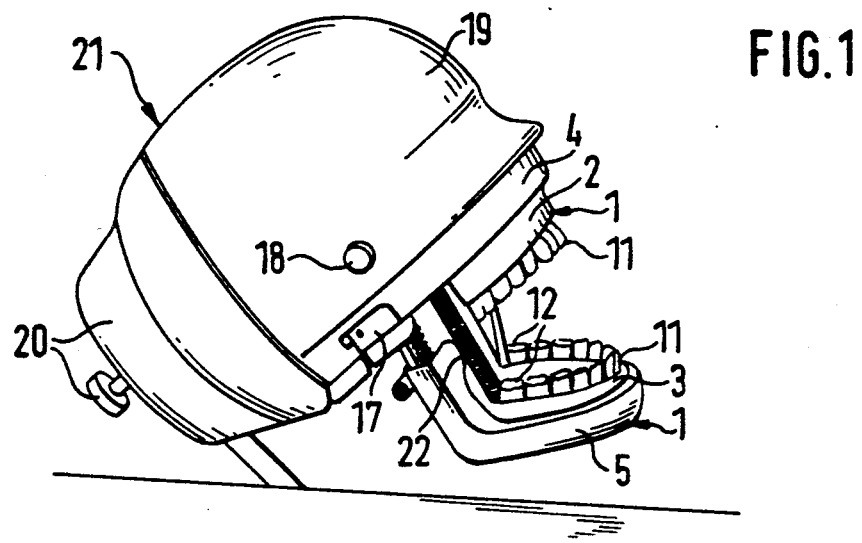
FIG. 1 illustrates a side view of the denture-skull in the open position thereof, with an attached cerebral skull portion.
Figure 2:
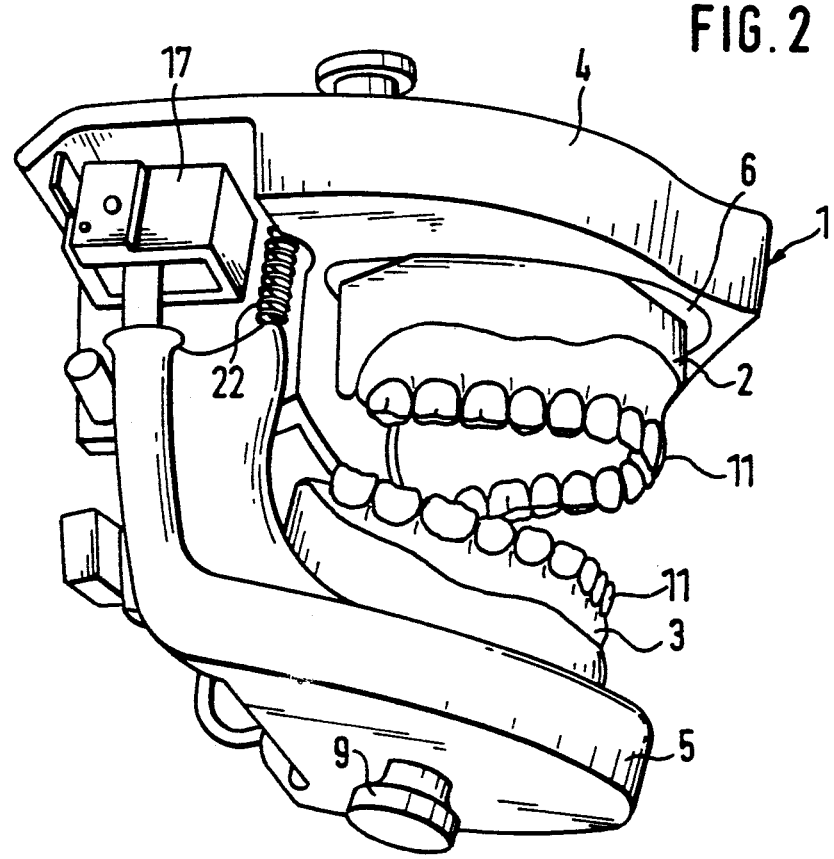
FIG. 2 illustrates a bottom and side perspective view of the denture-skull.
Figure 3:
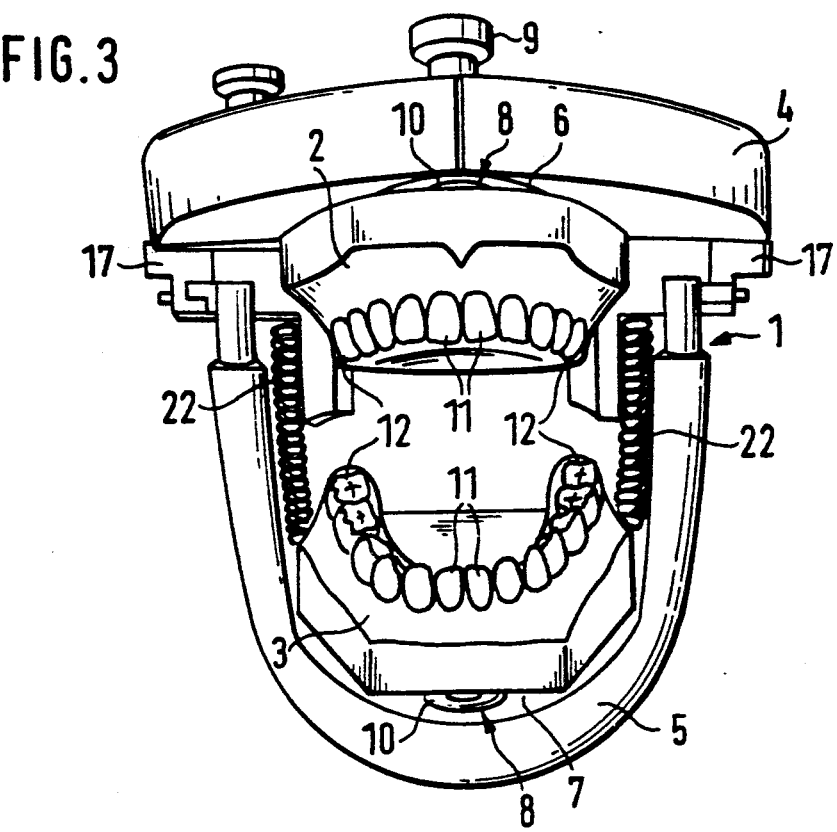
FIG. 3 illustrates a front view of the denture-skull.

The artificial denture-skull 1 includes an upper jaw model 2 which is arranged on an upper support plate 4 and a lower jaw model 3 which is arranged on a lower support plate 5, whereby both support plates 4, 5 on the inner sides thereof facing their dentures for the mounting of the jaw models 2, 3, include an O-ring seating arrangement 8 for the jaw models 2, 3, against which there can be clamped or tightened the jaw models 2, 3, with their base surface 16 through, respectively, the intermediary of a clamping device 9 extending through the support plates 4, 5 and being manipulatable from the outside, in the illustrated case, through the use of a clamping screw.

The teeth of the jaw model 2, 3 are identified by reference numerals 11, 12. The lower support plate 5 is connected for pivoting movement with the upper support plate 4 through two jaw linkages 17 which are arranged at, respectively, the two sides of the jaw models 2, 3. By means of a releasable latching means 18, the denture-skull 1 is connected with a cerebral cavity-forming skull portion 19. Reference numeral 20 identifies retaining and adjusting means of the phantom head 21 which is formed from the denture-skull 1 and the cerebral cavity-skull 19.

The lower jaw model 3, or respectively, the lower support plate 5, is downwardly pivotable in opposition to the action of a locking spring device 22, away from the upper jaw model 2 or, respectively, the upper support plate 4.

The O-ring seating arrangement 8 consists of a plurality of O-rings 10 which are spaced relative to each other. In the embodiment pursuant to FIG. 4 there are provided three mutually spaced O-rings 10.

The O-ring seating arrangement 8 is located on clamping surfaces 6, 7 which are introduced into the support plates 4, 5.

The three O-rings 10 are arranged in the region of the circumference; in effect, close to the circumference of the applicable clamping surfaces 6, 7. Three O-rings 10 generally are at about the same distance from each other. Furthermore, the three O-rings 10 each have an outer diameter of about 1.5 cm.

Figure 4:
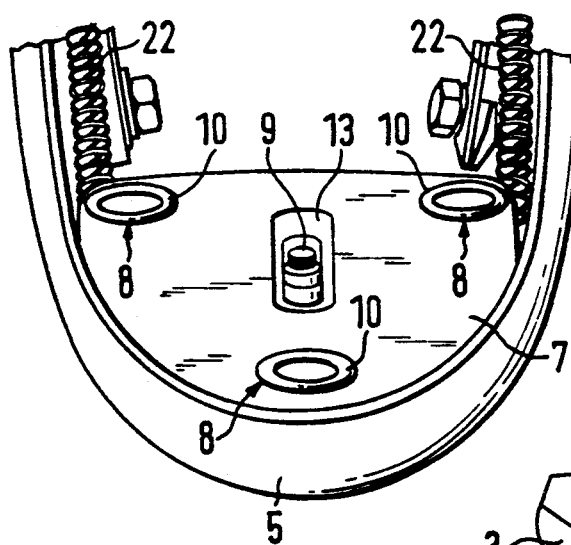
FIG. 4 illustrates the lower support plate for the denture-skull without the lower jaw model in a perspective view from above and from the front.
Figure 5:
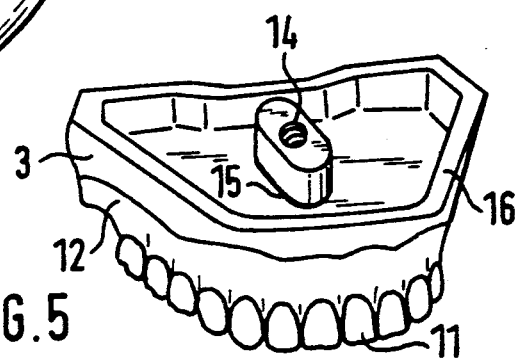
FIG. 5 illustrates the lower jaw model by itself, shown in a perspective view facing towards the side of the model opposite the mouth opening.

As is especially illustrated in FIGS. 4 and 5, there are provided, respectively, one O-ring 10 in the region of the incisors 11, and the two other O-rings 10 in the region of the posterior or buccal teeth 12 of the jaw models 2, 3.

For a still further improved obtention of a secure and uniform contacting of the base surface 16 of the jaw models 2, 3 against the O-ring seating arrangement 8, the construction pursuant to FIGS. 4 and 5 is such that a centering recess 13 is presently provided in the support plates 4, 5, or respectively in the clamping surfaces 6, 7, for the receipt of a centering attachment 14 arranged on the side of the jaw models 2, 3 remote from the mouth.

In order that the jaw model 2 or 3 which is equipped with the centering attachment 14 can also be fastened to support plates 4, 5 which do not possess a centering recess, the centering attachment 14 is provided with a breaking location 15 so that, in the case of need, in a simple manner the centering attachment 14 can be broken off at the mentioned breaking location 15.

What is claimed is:

1. Artificial dental denture-skull comprising a model of an upper jaw, an upper support plate having said jaw model arranged thereon; a model of a lower jaw, a lower support plate having said lower jaw model arranged thereon; said two support plates each having O-ring seating means for receipt of the jaw models on the sides thereof facing the dentures; clamping means extending through said support plates and being manipulatable for clamping the back surfaces of said jaw models against said seating means, whereby any uneven portion of said centering attachment remaining after being broken will not effect the support of said jaw model by said O-rings said O-ring seating means comprising three spaced O-rings at mutually substantially the same spacings from each other, said O-ring seating means being arranged on clamping surfaces on said support plates, said O-rings being arranged in the region of the circumference of the respective clamping surfaces; said upper jaw and lower jaw each being provided with teeth, such that one said O-ring is located in the region of the incisors and the other two O-rings are located in the region of the posterior teeth of the jaw models; a single elongate centering recess being formed in said respective support plates each for the receipt of a single elongate centering attachment which is located on the side of the jaw models distant from the mouth for securing said jaw models to said support plates, and said centering attachment being each provided with a breaking location at a base end thereof.

* * * * *